United States Patent [19]

Werner et al.

[11] Patent Number: 4,886,023

[45] Date of Patent: Dec. 12, 1989

[54] CRANKSHAFT DRIVE OF AN INTERNAL-COMBUSTION ENGINE OF V-TYPE

[75] Inventors: Johannes Werner, Waiblingen; Walter Kerschbaum, Fellbach; Rolf Heinrich, Weinstadt, all of Fed. Rep. of Germany

[73] Assignee: Mercedes-Benz AG, Stuttgart, Fed. Rep. of Germany

[21] Appl. No.: 234,919

[22] Filed: Aug. 22, 1988

[30] Foreign Application Priority Data

Aug. 22, 1987 [DE] Fed. Rep. of Germany ....... 3728013

[51] Int. Cl.⁴ .............................................. F02B 75/32
[52] U.S. Cl. .................. 123/197 AC; 74/596; 74/603
[58] Field of Search ........ 123/197 AC, 55 V, 55 VE, 123/55 VS, 55 VF; 74/595, 596, 603

[56] References Cited

U.S. PATENT DOCUMENTS

| 2,632,340 | 3/1953 | Dolza et al. | 74/603 |
| 2,800,809 | 7/1957 | Pike | 74/594 |
| 3,108,913 | 10/1963 | Sommer | 74/595 |
| 3,116,724 | 1/1964 | Elger et al. | 123/55 |
| 3,166,054 | 1/1965 | Conover | 123/55 VS |

FOREIGN PATENT DOCUMENTS 2209945 9/1973 Fed. Rep. of Germany .
3541903 3/1987 Fed. Rep. of Germany .

Primary Examiner—Noah P. Kamen
Attorney, Agent, or Firm—Barnes & Thornburg

[57] ABSTRACT

The invention relates to a crankshaft drive for an internal-combustion engine of V-type with a crankshaft, which has two mutually offset crank pins per throw, which pins are interconnected via an intermediate web. In order both to minimize the amount of machining required on the intermediate web and to ensure an optimum axial guidance of two connecting rods mounted on the crank pins, the intermediate web has an axial stop collar on either side and the intermediate web is of an enlarged design such that the axial stop surface of the connecting rods cannot jut out from the projected area of the intermediate web in any crankshaft position.

9 Claims, 2 Drawing Sheets

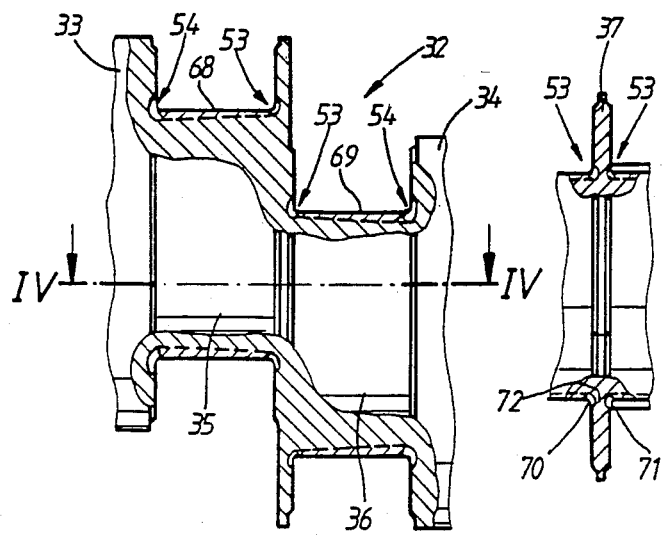
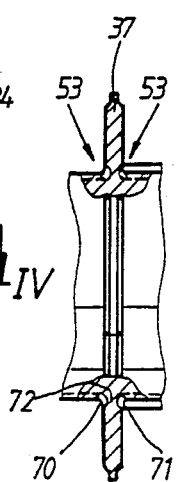
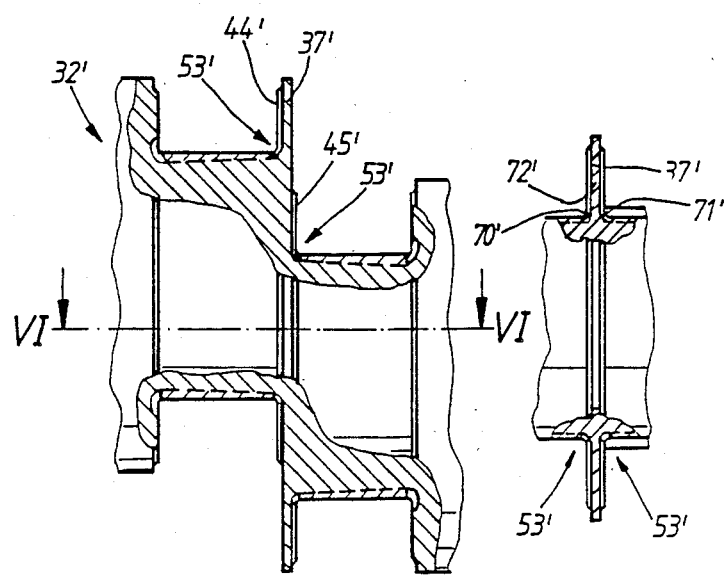

4,886,023

CRANKSHAFT DRIVE OF AN INTERNAL-COMBUSTION ENGINE OF V-TYPE

BACKGROUND AND SUMMARY OF THE INVENTION

The invention relates to a crankshaft drive of a V-type internal-combustion engine having a crankshaft with two mutually offset crank pins positioned between two crankshaft webs. A connecting rod is mounted on each crank pin by its large connecting rod eye. Each connecting rod is axially guided on a first side by a crankshaft web and on a second side, via an axial stop surface arranged on the rod shank-sided part of the large connecting rod eye, by a non-lateral-load-bearing intermediate web which interconnects the two crank pins, a projected contour of intermediate enveloping that of the two crank pins.

In the case of the crankshaft drive disclosed by German Published Unexamined Application (DOS) No. 3,541,903, the radii intersections and associated high notch stresses, which are problematical from aspects of production engineering, are avoided by the use of an intermediate web between the offset crank pins.

In the case of the crankshaft drive disclosed by German Published Unexamined Application (DOS) No. 3,541,903, the radii intersections and associated high notch stresses, which are problematical from aspects of production engineering, are avoided by the use of an intermediate web between the offset crank pins.

An object of the present invention is to provide a crankshaft drive of the type described above which both minimizes the required amount of machining on the intermediate web and ensures an optimum axial guidance of the two connecting rods at each position of the crankshaft during rotation of the crankshaft.

This object is achieved according to preferred embodiments of the invention by providing the intermediate web with an axial stop collar on either side and with an enlarged cross-sectional area so that at each crankshaft position, the projected cross-sectional area of the intermediate web extends over the axial stop surface of a respective connecting rod.

The design of the crankshaft drive according to the invention advantageously ensures that the axial stop surface arranged on the connecting rod facing part of each large connecting rod eye does not jut out beyond the projected contour of the intermediate web during crankshaft rotation, so that the connecting rod eyes always abut the intermediate web over a maximum stop surface. Furthermore, with the crankshaft drive constructed according to certain preferred embodiments, the fine machining of the intermediate web is restricted to just a surface grinding of the two axial stop collars according to the invention.

The crankshaft drive according to the invention makes possible the general use of connecting rods having bearing covers which are not involved in the axial guidance of the connecting rods. An increase in the mass of the crankshaft drive due to the intermediate web can thus be compensated for by a reduction in width of the bearing cover. Preferably, the width of respective bearing covers for the connecting rod connections with the crankshaft is reduced by an amount corresponding to the increase in weight resulting from the addition of the intermediate web.

In order to achieve an improvement in the load bearing capacity of the connecting rod bearings in certain preferred embodiments, the bearings are widened in the direction of the intermediate web. This is made possible due to the provision of designing the crank pin transition radii facing the intermediate web smaller than crank pin transition radii facing the crankshaft web. This arrangement corresponds to the distribution of stresses along the throw arrangement, in which, due to the form factors, the maximum stresses occur in the region of the basic pin flutes.

Further, the load bearing safety of the crankshaft is improved in the region close to the intermediate web by subjecting the smaller, and consequently more notch-sensitive transition radii facing the intermediate web, to a peripheral radii hardening of a relatively low hardness depth penetration. This hardening is executed so that the resulting hardening zones on either side of the intermediate web do not intersect and leave a soft zone at the overlapping cross-section of the crank pins. The low hardness penetration depths of the crank pin transition radii facing the intermediate web, due to the small width of the intermediate web, compared with the basic web radii, provides that an even transition of the hardness profile along the pin length is appropriate.

An additional safeguard against peripheral hardening cracks in the intermediate web at the transition from the hardened to the unhardened regions can be achieved according to certain preferred embodiments by dimensioning the hardness penetration depth in the intermediate web transition such that a narrow unhardened zone remains on a level with the imaginary radii intersections.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic sectional side view which shows the hardness regions of the crankshaft drive of FIG. 1;

FIG. 4 is a partial sectional schematic view of the crankshaft of FIG. 3 taken along the line IV—IV;

FIG. 5 is a schematic, sectional, side view which shows the hardness regions of a modified crankshaft drive similar to FIG. 6 but hardened according to a further embodiment; and FIG. 6 is a partial sectional schematic view of the crankshaft drive of FIG. 5 taken along the line VI—VI.

DETAILED DESCRIPTION OF THE DRAWINGS

Figure 1:
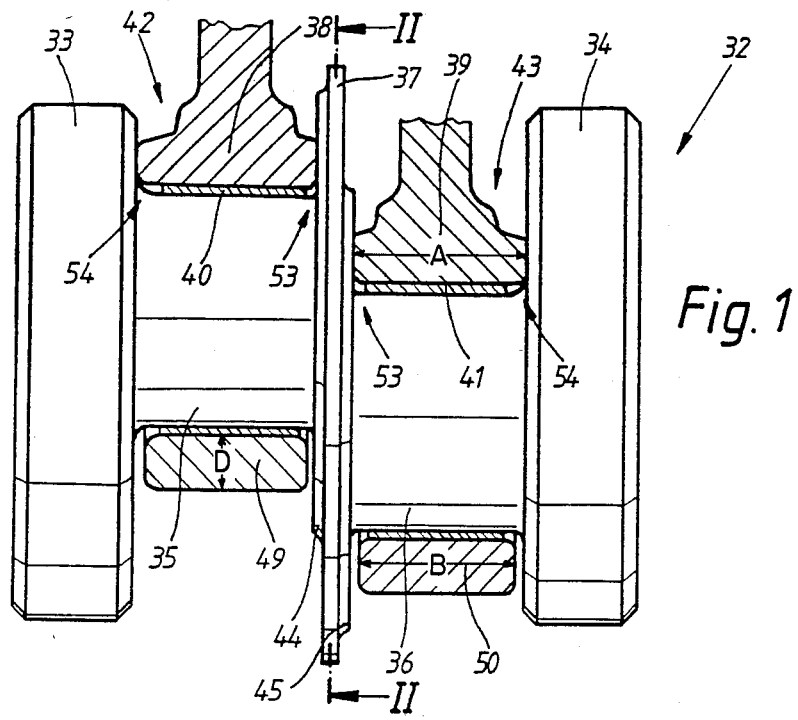
FIG. 1 is a schematic, partial, sectional side view of a crankshaft drive constructed according to a preferred embodiment of the invention.

FIG. 1 shows a throw 32 of a crankshaft fitted in a V-type engine. Between the two crankshaft webs 33 and 34 of the throw 32 are arranged two crank pins 35 and 36, mutually offset by about 30°. Because the crank pin offset is so large, in certain crankshaft position, connecting rods with opposing axial stop surfaces and narrow bearing covers jut out from the common axial stop overlap. As a result, the connecting rods can no longer be axially guided adequately at these certain crankshaft positions by the neighboring connecting rods. Therefore, a narrow intermediate web 37 is provided between the two crank pins 35 and 36, which serves as axial stop for both connecting rod eyes 38, 39 of connecting rods 42, 43 which are each mounted rotatably on one of the crank pins 35, 36 via a bearing shell 40 and 41 respectively and each have a width A.

On the sides facing away from the intermediate web 37, the two connecting rod eyes 38 and 38 are guided axially by the two crankshaft webs 33 and 34 respectively. In the axial stop region, the intermediate web 37 is provided on either side with an axial stop collar 44 and 45 so that, during the production of the crankshaft and the intermediate web 37, only the axial stop collars 44 and 45 have to be micro-finished.

Figure 2:
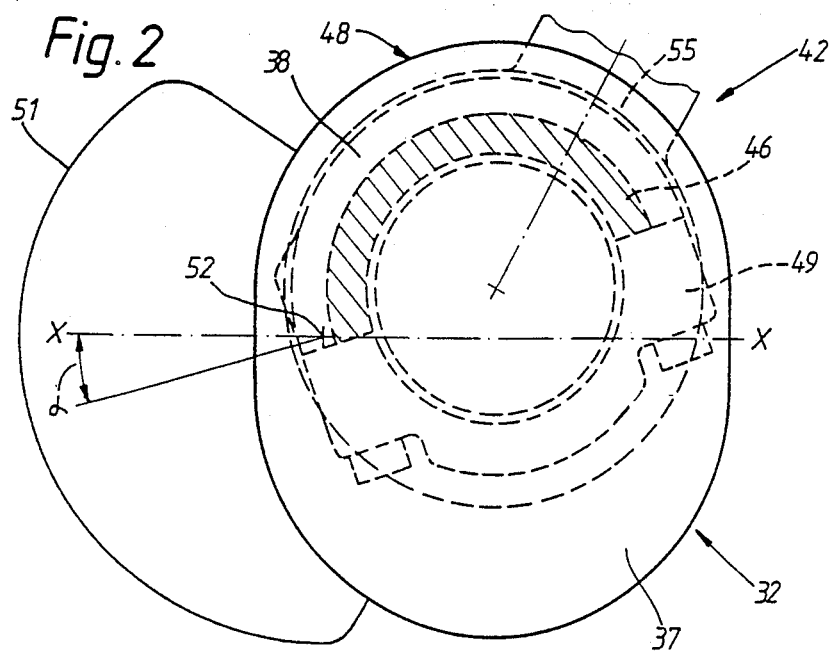
FIG. 2 is a schematic sectional view taken along the line II—II of FIG. 1.

FIG. 2 shows the throw 32 of FIG. 1 in section taken along line II—II of FIG. 1, the shading of the sectional intermediate web 37 having been omitted for reasons of clarity. The intermediate web 37 is preferably dimensioned such that the axial stop surface 46 (shaded area) arranged on the connecting rod eye 38 does not jut out from the projected contour 48 of the intermediate web 37 at any crankshaft position. That is, at each crankshaft position, during rotation of the crankshaft, the sectional area of the axial stop surface (46) of the respective connecting rod (42 and 43) and of the intermediate web projected area 55 always overlap the stop surface 46 completely.

Due to the design of the intermediate web 37, the axial guidance of the connecting rod 42 need only take place via the connecting rod facing part of the connecting rod eye 38. Therefore, the width B of the bearing cover 49, which has a predetermined depth D and a predetermined density, is reduced by an amount corresponding to half of the increase in weight resulting from the addition of the intermediate web 37, similarly, the width B of bearing cover 50 which also has a predetermined depth D and a predetermined density, is reduced by the same amount.

For the sake of simplicity, FIG. 2 shows only the left side of the throw 32 and the axial stop of the connecting rod 42. Of course, a similar description here also applies to the axial stop of the connecting rod 43.

Counterweights 51, arranged on the two crankshaft webs 33 and 34 to balance their masses, are arranged such that they are turned about the basic pin longitudinal axis 52 by the same angle of rotation V with respect to the main throw direction X—X (to facilitate production).

In order to further widen the connecting rod bearing shells 40 and 41 in the direction of the intermediate web 37, the radii at the intermediate web transitions 53 are designed smaller than the radii of the crankshaft web transitions 54 (see FIG. 1).

Referring to FIG. 3, which shows a longitudinal section of the crankshaft throw 32 of FIG. 1, both the transition radii 54 to the crankshaft webs 33 and 34 and the radii 53 to the intermediate web 37 have undergone a peripheral inductive radii hardening. The hardness penetration depth at the transitions 54 to the crankshaft webs 33 and 34 is deeper than at the intermediate web transition 53 due to the higher stressing at transitions 54. Accordingly, the two crank pins 35 and 36 are provided with a hardened surface 68 and 69, respectively, the hardness penetration depth of the surfaces 68 and 69 decreasing continuously from the crankshaft web transition 54 to the intermediate web transition 53 as seen in FIG. 3.

FIG. 4 shows a partial view of a throw in longitudinal section a level corresponding to an imaginary radii intersection (FIG. 3, line IV—IV). As shown in FIG. 4, the hardness penetration depth at the transition radii 53 is chosen such that a soft unhardened zone 72 remains between the hardened zones 70 and 71.

A further advantageous embodiment is shown in FIGS. 5 and 6, which illustrate a throw 32' corresponding to that of FIG. 3, the only difference being that in the embodiment of FIG. 5 and 6, hardening in the intermediate web region 53' is not restricted only to the transition radii, but rather, extends over the entire axial stop collars 44' and 45'. This arrangement prevents the possible occurrence of peripheral hardening cracks in the free part of the intermediate web 37' at the transition structure from hardened material to unhardened material.

In the embodiment illustrated by FIGS. 5 and 6, there is also provided soft unhardened zone 72' in the imaginary area of intersection between the hardened zones 70' and 71' provided on both sides of the intermediate web 37' (see FIG. 6 analogous to FIG. 4). Also, the hardness penetration depth of the axial stop collars 44' and 45' is smaller than the width of the intermediate web 37'.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Crankshaft drive of an internal-combustion engine of V-type with a crankshaft, which has two mutually offset crank pins between two crankshaft webs in each case, on each of which pins a connecting rod is mounted at a connecting rod connection by its large connecting rod eye having a width A, each of the connection rod connections including a bearing cover having a width B and a predetermined density and depth, each connecting rod being axially guided on a first side by a crankshaft web and on a second side via an axial stop surface arranged on the rod shank-sided part of the large connecting rod eye adjacent a non-lateral-load-bearing intermediate web which interconnects the two crank pins and has a cross-sectional area which is greater than overlapping cross-sectional areas of the two crank pins, wherein the intermediate web has an axial stop collar on either side, and wherein the intermediate web is of an enlarged design such that in each crankshaft position the cross-sectional area of the intermediate web extends over the axial stop surface of the respective connecting rod and wherein the difference of widths A and B times the predetermined depth and density of the bearing covers equals approximately the added weight of the intermediate web for the respective crankshaft throw.

2. Crankshaft drive according to claim 1, wherein each of the two mutually offset crank pins has transition radii, crankshaft web-sided crank pin transition radii being designed greater than intermediate web-sided transition radii.

3. Crankshaft drive according to claim 2, wherein the transition radii are inductively hardened around a periphery in such a way that the hardness penetration depth at the crankshaft web-sided crank pin transition radii is greater than that at the intermediate web-sided transition radii.

4. Crankshaft drive according to claim 3, wherein the hardness penetration depth in the intermediate web transition is dimensioned such that a narrow unhardened zone remains on a level with an imaginary radii intersection of transition radii of the two mutually offset crank pins.

5. Crankshaft drive according to claim 3, wherein the crank pins have a surface hardening, the hardness penetration depth of which reduces continuously from the crankshaft web transitions to the intermediate web transitions.

6. Crankshaft according to claim 5, wherein an intermediate web-sided peripheral hardening extends over the entire surface of the axial stop collars, the hardness penetration depth of the axial stop collars being smaller than the width of the intermediate web.

7. Crankshaft drive according to claim 5, wherein the hardness penetration depth in the intermediate web transition is dimensioned such that a narrow unhardened zone remains on a level with an imaginary radii intersection of transition radii of the two mutually offset crank pins.

8. Crankshaft drive according to claim 3, wherein an intermediate web-sided peripheral hardening extends over the entire surface of the axial stop collars, the hardness penetration depth of the axial stop collars being smaller than the width of the intermediate web.

9. Crankshaft drive according to claim 8, wherein the hardness penetration depth in the intermediate web transition is dimensioned such that a narrow unhardened zone remains on a level with an imaginary radii intersection of transition radii of the two mutually offset crank pins.

* * * * *